(12) United States Patent
Lin

(10) Patent No.: US 11,039,353 B2
(45) Date of Patent: Jun. 15, 2021

(54) HANDOVER PARAMETER SETTING METHOD

(71) Applicant: Sercomm Corporation, Taipei (TW)

(72) Inventor: Ben Lin, Taipei (TW)

(73) Assignee: Sercomm Corporation, Taipei (TW)

(*) Notice: Subject to any disclaimer, the term of this patent is extended or adjusted under 35 U.S.C. 154(b) by 0 days.

(21) Appl. No.: 16/219,875

(22) Filed: Dec. 13, 2018

(65) Prior Publication Data

US 2019/0313302 A1 Oct. 10, 2019

(30) Foreign Application Priority Data

Apr. 9, 2018 (CN) .......................... 201810312727.1

(51) Int. Cl.
H04W 4/00 (2018.01)
H04W 36/00 (2009.01)
H04B 17/318 (2015.01)
H04B 17/382 (2015.01)
H04W 36/08 (2009.01)
H04W 36/30 (2009.01)
H04W 36/32 (2009.01)
H04W 92/20 (2009.01)

(52) U.S. Cl.
CPC ...... *H04W 36/0094* (2013.01); *H04B 17/318* (2015.01); *H04B 17/382* (2015.01); *H04W 36/08* (2013.01); *H04W 36/30* (2013.01); *H04W 36/32* (2013.01); *H04W 92/20* (2013.01)

(58) Field of Classification Search
CPC ..... H04W 36/08; H04W 36/14; H04W 84/12; H04W 36/0055; H04W 36/0022; H04W 36/0083; H04W 36/0094; H04W 92/20; H04W 36/32; H04W 36/30; H04B 17/318; H04B 17/382
See application file for complete search history.

(56) References Cited

U.S. PATENT DOCUMENTS

| 2004/0053615 A1* | 3/2004 | Kim | ................ | H04W 36/30 455/436 |
| 2006/0281462 A1* | 12/2006 | Kim | ................ | H04W 36/30 455/436 |
| 2008/0014918 A1* | 1/2008 | Ito | ................ | H04B 17/318 455/423 |

(Continued)

FOREIGN PATENT DOCUMENTS

| CN | 102577508 A | 7/2012 |
| CN | 102740335 A | 10/2012 |

(Continued)

*Primary Examiner* — Atique Ahmed
(74) *Attorney, Agent, or Firm* — Winston Hsu

(57) ABSTRACT

A handover parameter setting method, which comprises: (a) a BS measuring a neighboring BS signal intensity by the BS itself; (b) the BS calculating a specific region signal intensity according to the neighboring BS signal intensity, wherein the specific region signal intensity is an expected signal intensity of the BS or the neighboring BS in a specific region; and (c) the BS setting a handover parameter according to the specific region signal intensity. By this way, the BS can measure the signal intensities of the neighboring BSes by itself, and controls the UE to handover at an appropriate neighboring BS signal intensity.

8 Claims, 3 Drawing Sheets

(56) References Cited

U.S. PATENT DOCUMENTS

| | | | | |
|---|---|---|---|---|
| 2010/0027507 A1* | 2/2010 | Li | ............... | H04W 36/0055 |
| | | | | 370/331 |
| 2011/0028175 A1* | 2/2011 | Chang | ............. | H04W 24/02 |
| | | | | 455/509 |
| 2011/0263256 A1* | 10/2011 | Yavuz | ............. | H04W 36/0085 |
| | | | | 455/436 |
| 2012/0064904 A1* | 3/2012 | Lee | ............... | H04W 72/082 |
| | | | | 455/450 |
| 2012/0140661 A1* | 6/2012 | Ohseki | ............ | H04L 1/0026 |
| | | | | 370/252 |
| 2014/0087739 A1 | 3/2014 | Weaver | | |
| 2014/0113634 A1* | 4/2014 | Cai | ............ | H04W 36/00837 |
| | | | | 455/436 |
| 2015/0215831 A1 | 7/2015 | Jung | | |
| 2016/0302119 A1* | 10/2016 | Chen | ............... | H04W 76/23 |

FOREIGN PATENT DOCUMENTS

| | | |
|---|---|---|
| CN | 102833800 A | 12/2012 |
| CN | 103096403 A | 5/2013 |
| CN | 103228007 A | 7/2013 |
| CN | 103283280 A | 9/2013 |
| CN | 103841602 A | 6/2014 |
| CN | 106034339 A | 10/2016 |

\* cited by examiner

HANDOVER PARAMETER SETTING METHOD

BACKGROUND OF THE INVENTION

1. Field of the Invention

The present invention relates to handover, and particularly relates to a handover parameter automatic setting method by which a base station can measure a signal intensity by itself.

2. Description of the Prior Art

A UE (User Equipment) can handover between different BSes (base stations) to maintain a good communication quality. Take FIG. 1 for example, at some time, the BS X may be responsible for providing communication services to the UE U. However, as the UE U moves, the neighboring BS Y may become more suitable for providing communication services to the UE U than the BS X. In this situation, the UE U can handover from the BS X which can be named as a source BS to the BS Y which can be named as a neighboring BS. However, it is difficult to perfectly set the conditions for triggering the handover. Too early or too late handover triggering both affect the user experience. Therefore, an innovative handover parameter setting method is needed to solve such problem.

SUMMARY OF THE INVENTION

Therefore, one objective of the present invention is to provide a handover parameter setting method, which can set a suitable handover parameter according to a neighboring BS signal intensity.

One embodiment of the present invention discloses a handover parameter setting method, which comprises: (a) a BS measuring a neighboring BS signal intensity by itself; (b) the BS calculating a specific region signal intensity according to the neighboring BS signal intensity, wherein the specific region signal intensity is an expected signal intensity of the BS or the neighboring BS in a specific region; and (c) the BS setting a handover parameter according to the specific region signal intensity.

Based on above-mentioned embodiments, the BS can measure the signal intensities of the neighboring BSes by itself, and controls the UE to handover at an appropriate neighboring BS signal intensity. By this way, the problem of difficulty in setting appropriate switching parameters in the prior art can be avoided.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
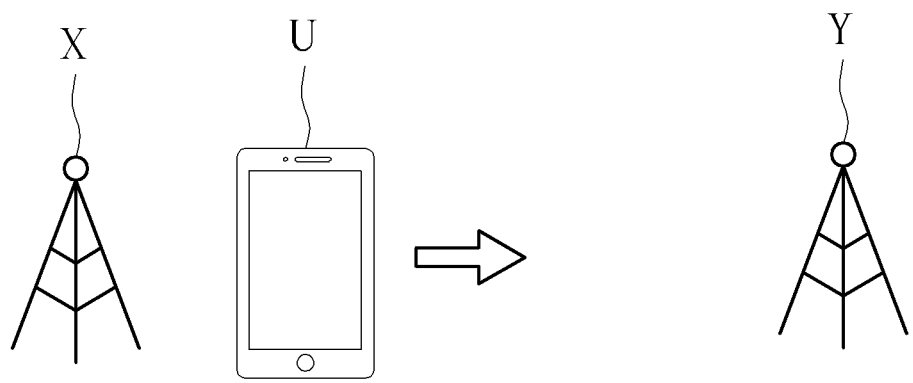
FIG. 1 is a schematic diagram illustrating a UE handovers between BSes in prior art.

The present invention discloses a handover parameter setting method. One of the methods is controlling a BS (base station) to measure a signal intensity of a neighboring BS at a location of the BS by the BS itself. Afterwards, the BS sets a handover parameter accordingly. For example, the BS can measure a signal intensity of a neighboring BS at the location of the BS, such as RSRP (Reference Symbol Received Power). Also, the BS can perform some steps such as sniffing and/or network listening to acquire a reference signal power of the neighboring BS or other neighboring BS information (e.g. information that can be used to identify the neighboring BS).

In one embodiment, the BS measures the signal intensity of the neighboring BS at the BS' own location by itself, and then calculates a possible signal intensity of the neighboring BS in a hypothetical region in which the expected signal intensity of the BS is likely equal to the expected signal intensity of the neighboring BS. Afterwards, the handover parameters are set according to the possible signal intensity. Of course, the BS can measure the signal intensity of the neighboring BS at the BS's own location by itself, and then calculates a possible signal intensity of the BS (rather than the neighboring BS) in a hypothetical region in which the expected signal intensity of the BS is likely equal to the expected signal intensity of the neighboring BS. After that, the handover parameters are set according to the possible signal intensity. In following embodiments, the possible signal intensities of the neighboring BSes are taken as examples for explaining, but the following embodiments can also be used to calculate the possible signal intensity of the BS itself.

Moreover, the handover parameter setting method disclosed by the present invention is not limited to a hypothetical region in which the expected signal intensity of the BS is likely equal to the expected signal intensity of the neighboring BS. It is also possible to find a hypothetical region in which the expected signal intensity of the BS is likely to have a specific relation with the expected signal intensity of the neighboring BS. This specific relation can be a specific ratio. For example, if the UE is desired to perform a handover when the signal intensity of the neighboring BS is stronger, a possible signal intensity of the neighboring BS in a hypothetical region in which a ratio between the expected signal intensity of the BS and the expected signal intensity of the neighboring BS is 2:3 can be calculated. After that, the handover parameters are adjusted according to the possible signal intensity. Conversely, if the UE is desired to perform a handover when the signal intensity of the BS is only a little stronger than the signal intensity of the neighboring BS, a possible signal intensity of the neighboring BS in a hypothetical region in which a ratio between the expected signal intensity of the BS and the expected signal intensity of the neighboring BS is 3:2 can be calculated. After that, the handover parameters are adjusted according to the possible signal intensity. The specific relation can also be a specific difference, for example, the expected signal intensity of the BS is greater than the expected signal intensity of the neighboring BS by a predetermined value. For the convenience of explaining, in following examples, a hypothetical region in which the relation between the expected signal intensity of the BS and the expected signal intensity of the neighboring BS is a specific relation is regarded as a specific region.

Figure 2:
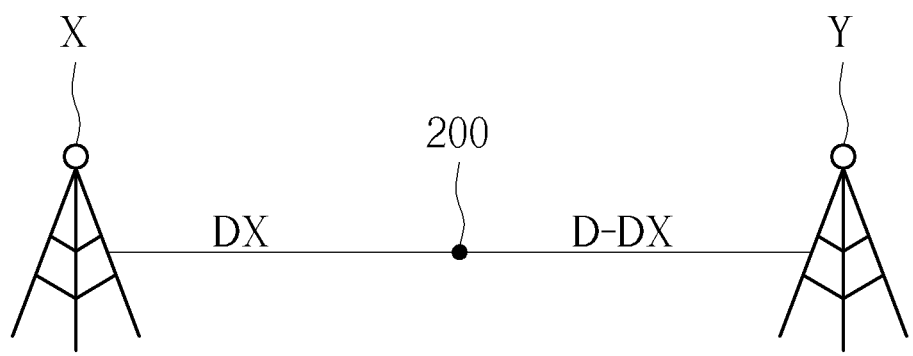
FIG. 2-FIG. 4 are schematic diagrams illustrating different examples of hypothetical regions.
Figure 3:
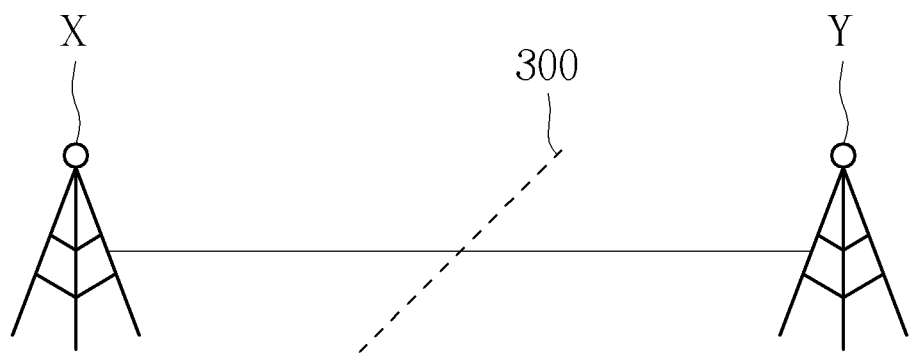
Figure 4:
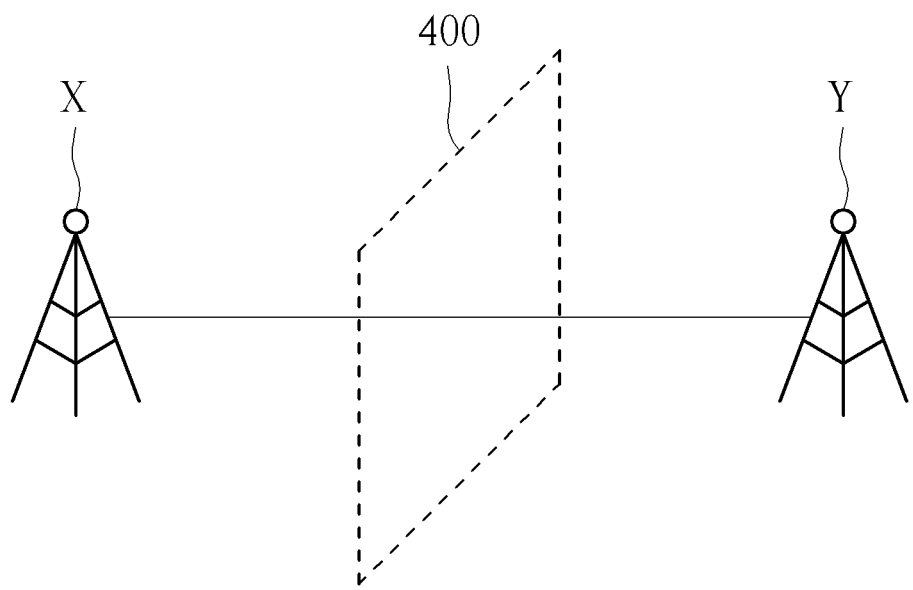

Moreover, the hypothetical region can be a point such as the hypothetical region 200 shown in FIG. 2, or can be a line such as the hypothetical region 300 shown in FIG. 3, or a surface such as the hypothetical region 400 shown in FIG. 400. That is, when the UE moves to the hypothetical region 200 which is a point in FIG. 2, the hypothetical region 300 which is aline in FIG. 3, or the hypothetical region 400 which is a surface in FIG. 4, the relation between the expected signal intensity of the BS and the expected signal intensity of the neighboring BS should be a specific relation. However, the hypothetical region is not limited to the examples in FIGS. 2 to 4. For example, the hypothetical region 300 in FIG. 3 can be a curve, and the hypothetical region 400 in FIG. 4 can be a curved surface. Alternatively, the hypothetical region in which the relation between the expected signal intensity of the BS and the expected signal intensity of the neighboring BS is a specific relation can be a 3D space.

Detail steps of how to find the expected signal intensity of the BS/neighboring BS in the above-mentioned hypothetical region will be described below. Please note, the expected signal intensity of the BS/neighboring BS in the hypothetical region can be the specific region signal intensity RSRP_spe in following descriptions. For example, the specific region signal intensity RSRP_spe can be the expected signal intensity of the neighboring BS when the relation between the expected signal intensity of the BS and the expected signal intensity of the neighboring BS is a specific ratio (1:1 in the following example). In other words, when a UE finds the signal intensity of the neighboring BS becomes RSRP_spe, the region where the UE locates may be the hypothetical region in which the signal intensity of the BS and the signal intensity of the neighboring BS is equal. Therefore, the BS sets the handover parameters according to the specific region signal intensity RSRP_spe. By this way, the UE can handover when approaching, locating at, or crossing the hypothetical region.

In one embodiment, the BS can calculate the specific region signal intensity RSRP_spe according to the transmitted signal intensity declared by the neighboring BS and the signal intensity of the neighboring BS measured by the BS at the BS' own location. For example, the specific region signal intensity RSRP_spe can be a weighted average (e.g. a median) of the transmitted signal intensity declared by the neighboring BS and the neighboring BS signal intensity measured by the BS. In another embodiment, the BS calculates the specific region signal intensity RSRP_spe according to a distance-signal intensity equation and a signal intensity of the neighboring BS measured by the BS at a location of the BS. In addition, the BS can further calculate the specific region signal intensity RSRP_spe according to a signal intensity declared by the BS, a signal intensity declared by the neighboring BS, a transmit power of the BS or the neighboring BS, or a receive power of the BS or the neighboring BS.

The distance-signal intensity equation is an equation used to indicate that the wireless signal intensity attenuations with distance. In one embodiment, the equation can be the following Equation (1):

$$RP\_measure = RP\_original + A + B\ \log(D) \qquad \text{Equation (1)}$$

The RP_original is the signal intensity declared by the neighboring BS (i.e. the reference signal intensity). For example, the RP_original can be the signal intensity of the signal sent by an antenna of the neighboring BS, that is, the signal intensity not affected by the environment or transmission attenuation. This value can be found in the packet sent by the neighboring BS, but is not limited to be acquired by this way. A and B are predetermined constant values, and RP_measure is a possible signal intensity of the neighboring BS at a point having a distance D from the neighboring BS. The values of A and B can be calculated based on the transmission loss rate of the wireless signal. For example, when a BS transmits a signal following the LTE (Long Term Evolution) standard, the propagation loss equation of the wireless signal can be shown as following Equation (2), i.e. an equation under the Keenam Motley model.

$$Lbs = 32.45 + 20\ \lg F(MHz) + 20\ \lg D(km) \qquad \text{Equation (2)}$$

However, the values of A and B may change corresponding to different transmission standards. Besides, the values of A and B can be set to any needed values corresponding to different requirements. Also, the above-mentioned F means a frequency.

In following descriptions, steps for calculating a signal intensity of the neighboring BS according to Equation (1) will be described. Take FIG. 2 for example, if a distance between the hypothetical region 200 and the BS X is DX and a distance between the BS X and the neighboring BS Y is D, then a distance between the hypothetical region 200 and the neighboring BS Y is D−DX. The following Equation (3) can be acquired based on equation (1) if the signal intensity of the BS and the signal intensity of the neighboring BS are the same at the hypothetical region 200:

$$RX + A + B\ \log(DX) = RY + A + B\ \log(D - DX) \qquad \text{Equation (3)}$$

RX is a reference signal intensity of the BS X (i.e. the signal intensity declared by the BS X), and RY is a reference signal intensity of the BS Y (i.e. the signal intensity declared by the neighboring BS Y).

The following Equation (4) can be acquired based on Equation (3), and the following Equation (5) can be acquired based on Equation (4):

$$\log(DX/(D-DX)) = (RY - RX)/B \qquad \text{Equation (4)}$$

$$(DX/(D-DX)) = 10\hat{\ }((RY-RX)/B) \qquad \text{Equation (5)}$$

If the $10\hat{\ }((RY-RX)/B)$ in the Equation (5) is replaced by K, the following Equation (6) can be acquired based on Equation (5):

$$DX = (D*K)/(1+K) \qquad \text{Equation (6)}$$

After that, if K in the Equation (6) is replaced by $10\hat{\ }((RY-RX)/B)$ again, the following Equation (7) can be acquired:

$$DX = D*10\hat{\ }((RY-RX)/B)/(1+10\hat{\ }((RY-RX)/B)) \qquad \text{Equation (7)}$$

The above symbol ˆ means exponentiation. The specific region signal intensity RSRP_spe is obtained by substituting the DX of the Equation (7) here into the Equation (1). The specific region signal intensity RSRP_spe in this example means that the expected signal intensity of the BS X and the neighboring BS Y are equal at the hypothetical region 200. The parameters of the Equation (3) can be modified to calculate the signal intensity RSRP_spe of the specific region when a relation between the expected signal intensity of the BS X and the neighboring BS Y is another specific ratio. For example, if the Equation (3) is modified to RX+A+B log(DX)=H*[RY+A+B log(D−DX)], the signal intensity RSRP_spe of the specific region when a relation between the expected signal intensity of the BS X and the neighboring BS Y is another specific ratio can be calculated via setting H. In addition, in another embodiment, the parameter in the Equation (3) can also be modified to calculate the specific region signal intensity RSRP_spe when the expected signal intensity of the base station X and the neighbor base station Y has a specific difference. For example, the Equation (3) can be modified to RX+A+B log(DX)=RY+A+B log(D−DX)+F, and the specific region signal intensity RSRP_spe when the expected signal intensity of the base station X and the neighbor base station Y has a specific difference can be acquired via setting F.

In another embodiment, the distance-signal intensity equation can be the following Equation (8):

$$PR = PT/(r^n) \quad \text{Equation (8)}$$

PT is a transmit power of the neighboring BS while PR is a receive power detected by the BS. r is a distance between the hypothetical region and the neighboring BS, and n is a signal propagation parameter. The value of n can be determined by the environment surrounding the BS (e.g. temperature, humidity, height, and shielding rate).

The Equation (9) can be acquired by taking the logarithm on both sides of Equation (8):

$$10*n \log r = 10*\log(PT/PR) \quad \text{Equation (9)}$$

As above-mentioned, PT is a transmit power, thus 10*log PT can be set as a known Q. Accordingly, the following Equation (10) can be acquired based on Equation (9).

$$10*\log PR = Q - 10*n \log r \quad \text{Equation (10)}$$

The left half part of the Equation (10), 10*log PR, means the receive power, thus can be converted to dBm, which can be directly written into the following Equation (11).

$$PR(\text{dBm}) = Q - 10*n \log r \quad \text{Equation (11)}$$

In Equation (11), Q is the transmit power of the neighboring BS, and n is a signal propagation parameter. Therefore, the values of the constants Q and n are known values. By this way, a relation between the receiving signal intensity and the signal transmitting distance can be acquired based on Equation (11).

However, please note that the distance-signal intensity equation is not limited to the two examples described above. After finding the specific region signal intensity RSRP_spe according to the distance-signal intensity equation, the BS can determine the handover parameters according to the specific region signal intensity RSRP_spe. In one embodiment, when the UE reaches the location at which the signal intensity of the neighboring BS (or the source BS) is equal to the specific region signal intensity RSRP_spe, a specific work or a handover to the neighboring BS is performed.

Taking LTE as an example, the handover parameter set by the BS according to the specific region signal intensity RSRP_spe may be one or more of the LTE A1, A2, A3, A4, A5, B1, B2 event parameters, and can be a Cell Individual Offset (CIO) as well. Additionally, the BS can provide the set of handover parameters to each UE which uses its service. In one embodiment, the BS determines an A1 event threshold, an A2 event threshold, and an A5 event threshold according to a specific region signal intensity RSRP_spe. Taking LTE as an example, the A1 event means the signal intensity of the source BS at the location of the UE is better than the threshold, and can be used to stop the ongoing inter-frequency measurement by the UE. The A2 event means the source BS signal intensity at the location of the UE is lower than the threshold, which can be used to enable the UE to start inter-frequency measurement. The A5 event means the source BS signal intensity at the location of the UE is lower than a first threshold, and the signal intensity of the neighboring BS is better than a second threshold. In one embodiment, the BS can set the A1 event threshold to RSRP_spe+15 dB, the A2 event threshold to RSRP_spe+5 dB, the first threshold of A5 event to RSRP_spe-5 dB, and the second threshold of the A5 event to RSRP_spe+5 dB. Please note that these values are only examples for explaining and do not mean to limit the present invention.

In one embodiment, after the BS calculates the specific region signal intensities of a plurality of neighboring BSes, the BS sets the handover parameter of each neighboring BS according to one of the signal intensities of the specific region signal intensities. In one embodiment, the handover parameters of the neighboring BSes are set with a maximum specific region signal intensity. For example, it is supposed that the specific region signal intensity of each neighboring BS is RSRP_spe1, RSRP_spe2, RSRP_spe3, . . . , and the maximum one is RSRP_speMax. Then, the BS changes the CIO values of each neighboring BS to RSRP_speMax−RSRP_spe1, RSRP_speMax−RSRP_spe2, and RSRP_speMax−RSRP_spe3, respectively. In another embodiment, the BS sets different handover parameters to each neighboring BS according to the specific region signal intensity of each neighboring BS. For example, in one embodiment, after the BS calculates the specific region signal intensities of a plurality of neighboring BSes, the BS respectively sets one or more of the A1 event thresholds, the A2 event thresholds and A5 event thresholds of neighboring BSes according to the specific region signal intensities. For example, the BS sets the A1 event thresholds of neighboring BSes. For another example, the BS sets the A1 event thresholds of neighboring BSes and the A2 event thresholds of neighboring BSes.

Figure 5:
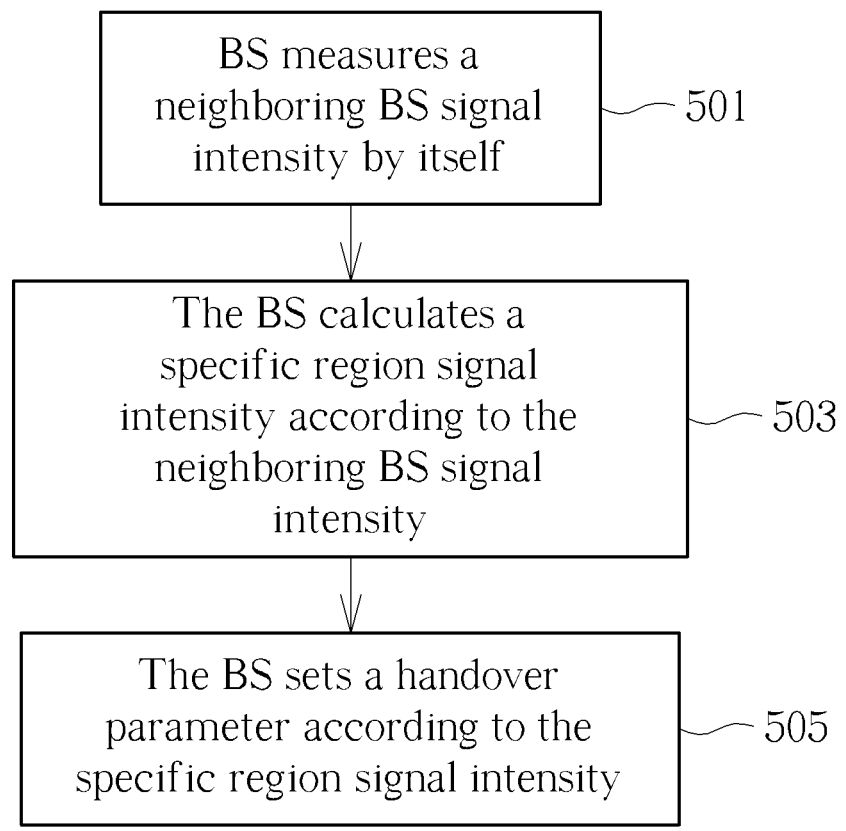
FIG. 5 is a flow chart illustrating a handover parameter setting method according to one embodiment of the present invention.

In view of above-mentioned embodiments, a handover parameter setting method illustrated in FIG. 5 can be obtained, which comprises following steps:

Step 501

A BS measures a neighboring BS signal intensity by itself. For example, this is the signal intensity of the neighboring BS received by the BS at its own location.

Step 503

The BS calculates a specific region signal intensity according to the neighboring BS signal intensity. The specific region signal intensity is a possible signal intensity of the neighboring BS or the BS when the expected signal intensity of the neighboring BS and the expected signal intensity of the BS have a specific relation. The specific relation can be, for example, a specific ratio or a specific difference. In some embodiments, the BS can calculate the specific region signal intensity according to at least one of: a distance-signal intensity equation (e.g. the Equation (1) and the Equation (8)), a reference signal intensity of the BS, a reference signal intensity of the neighboring BS, transmit powers of the BS or the neighboring BS, and received powers of the BS or the neighboring BS.

Step 505

The BS sets a handover parameter according to the specific region signal intensity.

In one embodiment, steps 501-505 are performed when the BS is activated. The step of measuring the neighboring BS and the step of calculating the handover parameter can be more accurate when the BS does not transmit signals. However, the steps 501-505 can be performed when the BS normally transmits signals.

In view of above-mentioned embodiments, the source BS can measure the signal intensity of the neighboring BS by itself at the location of the source BS. Such that the source BS can calculate the appropriate handover parameters without the special assistance of the UE or the neighboring BS, such that appropriate handover parameters can be calculated without establishing a specific information exchange mechanism with the UE or with the neighboring BS. Therefore, the triggering of the handover is relatively reliable, thereby the accuracy of the handover of the UE and the user experience can be improved. Moreover, the source BS adjusts the handover parameter according to the signal intensity of the neighboring BS received by the location of the source BS, and this value is always different from the signal intensities of the neighboring BS measured by UEs at different locations. In the prior art, the measurement is performed by UEs at different locations, thus the measured signal intensities of the neighboring BSes are different and is susceptible to terrain or nearby buildings. Accordingly, if the neighboring BS signal intensities are measured by the UEs, the specific region signal intensity may not be correctly calculated.

Based on above-mentioned embodiments, the BS can measure the signal intensities of the neighboring BSes by itself, and controls the UE to handover at an appropriate neighboring BS signal intensity. By this way, the problem of difficulty in setting appropriate switching parameters in the prior art can be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A handover parameter setting method, comprising:
   (a) a BS (Base Station) measuring a neighboring BS signal intensity by the BS itself at the BS' own location;
   (b) the BS calculating a specific region signal intensity according to the neighboring BS signal intensity, wherein the specific region signal intensity is an expected signal intensity of the BS or the neighboring BS in a specific region, wherein the specific region is between the BS and the neighboring BS; and
   (c) the BS setting a handover parameter according to the specific region signal intensity;
   wherein the handover parameter is for controlling a UE (user Equipment) to handover while the UE approaching, locating at, or crossing the specific region;
   wherein the step (b) calculates the specific region signal intensity according to the neighboring BS signal intensity and at least one of a distance-signal intensity equation, a reference signal intensity of the BS, and a reference signal intensity of the neighboring BS;
   wherein the distance-signal intensity equation is:

$$RP\_measure = RP\_original + A + B\log(D) \text{ or } PR = PT/(r^n)$$

wherein the RP_original is the reference signal intensity of the neighboring BS, the A and the B are constant values, the RP_measure is the neighboring signal intensity in a hypothetical region having a distance D from the neighboring BS, the PR is a receive power detected by the BS or the neighboring BS, the PT is a transmit power of the BS or the neighboring BS, the r is a distance between the hypothetical region and the neighboring BS, and the n is a signal propagation parameter.

2. The handover parameter setting method of claim 1, wherein an expected signal intensity of the neighboring BS has a specific relation with an expected signal intensity of the BS in the specific region.

3. The handover parameter setting method of claim 2, wherein the specific relation is a specific ratio or a specific difference exists between the expected signal intensity of the neighboring BS and the expected signal intensity of the BS.

4. The handover parameter setting method of claim 1, wherein the step (b) calculates a plurality of the specific region signal intensities of a plurality of the neighboring BSes, and the step (c) sets a plurality of the handover parameters of a plurality of the neighboring BSes according to one of the specific region signal intensities.

5. The handover parameter setting method of claim 4, wherein the step (c) sets a plurality of the handover parameters of a plurality of the neighboring BSes according to a maximum one of the specific region signal intensities.

6. The handover parameter setting method of claim 1, wherein the step (b) calculates a plurality of specific region signal intensities of the neighboring BSes, and respectively sets at least one of an A1 event threshold value, an A2 event threshold value and an A5 event threshold value according to the specific region signal intensities.

7. The handover parameter setting method of claim 1, wherein the BS measures the neighboring signal intensity at the BS's own location.

8. The handover parameter setting method of claim 1, wherein the step (b) calculates a weighted average value of a transmitted signal intensity declared by the neighboring BS and the neighboring signal intensity measured by the BS as the specific region signal intensity.

* * * * *